United States Patent [19]

Toyama et al.

[11] Patent Number: 5,588,515
[45] Date of Patent: Dec. 31, 1996

[54] METHOD OF AND APPARATUS FOR SPEED CHANGE CONTROL

[75] Inventors: Makoto Toyama; Yoshikazu Asai, both of Ishikawa, Japan

[73] Assignee: Kabushiki Kaisha Komatsu Seisakusho, Tokyo, Japan

[21] Appl. No.: 397,206

[22] PCT Filed: Sep. 10, 1993

[86] PCT No.: PCT/JP93/01289

§ 371 Date: Mar. 10, 1995

§ 102(e) Date: Mar. 10, 1995

[87] PCT Pub. No.: WO94/05523

PCT Pub. Date: Mar. 17, 1994

[30] Foreign Application Priority Data

Sep. 10, 1992 [JP] Japan .................. 4-268082

[51] Int. Cl.$^6$ .................................................. B60K 41/26
[52] U.S. Cl. ...................... 192/4 C; 192/109 F
[58] Field of Search ................. 192/4 C, 109 F

[56] References Cited

U.S. PATENT DOCUMENTS

| | | | |
|---|---|---|---|
| 3,606,906 | 9/1971 | Shore | 192/4 C |
| 3,910,389 | 10/1975 | Pleier | 192/4 C |
| 4,248,330 | 2/1981 | Audiffred, Jr. et al. | 192/4 C |
| 4,300,652 | 11/1981 | Redzinski et al. | 192/4 C X |
| 4,715,145 | 12/1987 | Takeda et al. | |
| 4,724,726 | 2/1988 | Knecht | 192/4 C X |
| 4,768,636 | 9/1988 | Ito et al. | |
| 4,924,983 | 5/1990 | Katayama et al. | |
| 5,058,460 | 10/1991 | Hibner et al. | 192/109 F X |

FOREIGN PATENT DOCUMENTS

| | | |
|---|---|---|
| 62-26133 | 2/1987 | Japan . |
| 62-233546 | 10/1987 | Japan . |
| 63-21062 | 5/1988 | Japan . |
| 1-156145 | 6/1989 | Japan . |
| 2-46326 | 2/1990 | Japan . |
| 2-168068 | 6/1990 | Japan . |

Primary Examiner—Richard M. Lorence
Attorney, Agent, or Firm—Sidley & Austin

[57] ABSTRACT

The thermal load on a transmission clutch, which is generated when a shift between forward and reverse is made, can be reduced and a shock from a speed change can be eliminated. To these ends, as soon as a speed change signal is received (step 150), an all clutch control system (ACC) is actuated to set a target acceleration in terms of the amount of control (steps 152, 154). Then, it is determined whether the speed change involves a shift between forward and reverse (FR speed change) (step 156). If the speed change is found to be the FR speed change, then it is further determined whether the vehicle speed V is larger than a reference value $V_O$ (step 158); if the vehicle speed is larger than the reference value, then the oil pressure for operating a steering brake is read from preestablished map data (step 160), and the steering brake is operated by the oil pressure which has been read (steps 162, 164). After that, the ACC control program goes back to step 156. If the speed change is found to be a non-FR speed change or a FR speed change wherein $V \leq V_O$, then the hydraulic gradient of a load clutch of the transmission is determined by a fuzzy reasoning (step 168), then clutch oil pressure $P_C$ based on the hydraulic gradient is determined to control the engaging force of the load clutch (steps 172, 174).

16 Claims, 8 Drawing Sheets

| SELECTION OF HYDRAULIC GRADIENT $\theta_C$ | | ACCELERATION DEVIATION | | | | |
|---|---|---|---|---|---|---|
| | | NB | NS | ZR | PS | PB |
| ACCELERATION DEVIATION CHANGING SPEED | NS | — | PS | — | ZR | — |
| | ZR | PB | — | ZR | — | NB |
| | PS | — | ZR | — | NS | — |

METHOD OF AND APPARATUS FOR SPEED CHANGE CONTROL

FIELD OF THE INVENTION

The present invention relates to a method of and apparatus for speed change control implemented by changing the rotational speed of a prime mover, such as an engine, and transmitting it to an output shaft, and, more particularly, to a method of and apparatus for speed change control which are ideally used for changing speed when switching between a vehicle forward gear and a reverse gear, especially in a gear shifting mechanism based on planetary gears, and which can be applied for changing the speed of or starting a vehicle.

BACKGROUND ART

Construction machines, such as bulldozers and wheel loaders, generally have gear shifting mechanisms based on planetary gears. Through the gear shifting mechanism based on the planetary gears, switching between forward and reverse travel and speed changes are accomplished.

Figure 10:
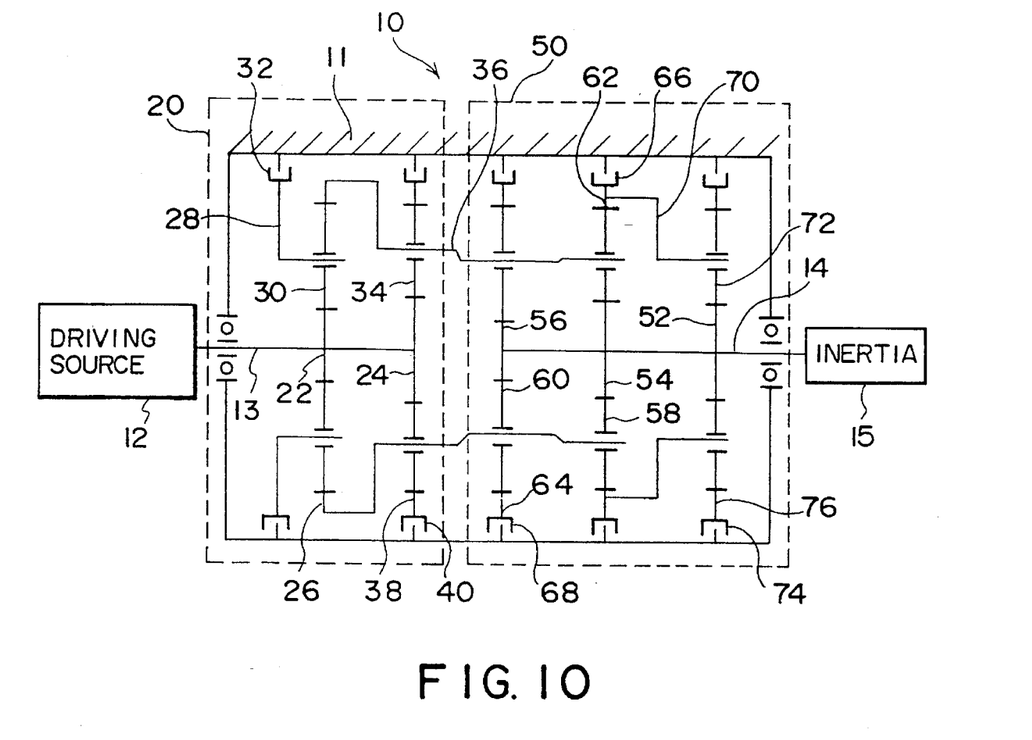
FIG. 10 is a schematic diagram showing a conventional planetary-gear type transmission.

FIG. 10 shows an example of a planetary-gear type transmission (hereinafter referred to as "transmission") 10 which is mounted on a construction machine. The transmission 10 has a forward/reverse gear selector 20 and a speed gear selector 50 housed in a case 11. The forward/reverse gear selector 20 has a reverse sun gear 22 and a forward sun gear 24 which are fixed on an input shaft 13 connected to a driving source 12, such as a torque converter. A ring gear 26 is disposed around the reverse sun gear 22; a reverse planetary gear 30, which is supported by a reverse carrier 28, is meshed with the ring gear 26 and the reverse sun gear 22. The carrier 28 can be engaged with or disengaged from the case 11 through the reverse clutch (R clutch) 32.

The ring gear 26 is connected to a forward planetary gear 34 meshed with the forward sun gear 24 and a carrier 36 which supports the planetary gear of the speed selector 50 to be discussed later. A forward ring gear 38 meshed with the planetary gear 34 can be engaged with or disengaged from the case 11 through a forward clutch (F clutch) 40.

The speed selector 50 has a sun gear 52 for first gear, a sun gear 54 for second gear, and a sun gear 56 for third gear, which are fixed on an output shaft 14. A planetary gear 58, meshed with the sun gear 54 for second gear, and a planetary gear 60 for third gear, meshed with the sun gear 56 for third gear, are supported by the carrier 36 which supports the forward planetary gear 34. Further, the planetary gear 58 for second gear and the planetary gear 60 for the third gear are meshed with a ring gear 62 for second gear and a ring gear 64 for third gear, respectively, which are disposed outside thereof. These ring gears 62 and 64 can be engaged with or disengaged from the case 11 through a second gear clutch 66 and a third gear clutch 68, respectively.

A carrier 70, connected to the ring gear 62 for second gear, supports a planetary gear 72 for first gear. The planetary gear 72 meshes with the sun gear 52 for first gear and also with a ring gear 76 for first gear, which is disposed around the sun gear 52 and which is engaged with or disengaged from the case 11 through a clutch 74 for first gear. A reference numeral 15 denotes the inertia of a vehicle.

The transmission 10 having the construction described above engages the clutch 32 or 40 of the forward/reverse gear selector 20 to select forward or reverse travel of a vehicle and obtains a required reduction ratio by engaging one of the clutches 66, 68, and 74 of the speed selector 50. For example, to set for the forward second gear, the transmission 10 causes the forward clutch 40 to engage with the second gear clutch 66, fixing the forward ring gear 38 and the ring gear 62 for second gear on the case 11, and releasing the other clutches.

The following gives more detailed description of the operating procedure for shifting from the reverse first gear into the forward second gear.

In the case of the reverse first gear, the reverse clutch 32 engages along with the clutch 74 for first gear, and the reverse carrier 28 and the ring gear 76 for first gear are fixed to the case 11, the other clutches being released. Therefore, in the first step, the reverse clutch 32 and the clutch 74 for first gear, which fix the reverse carrier 28 and the ring gear 76 for first gear, respectively, to the case 11, are disengaged. In the second step, the hydraulic pressure to the clutch 66 for second gear and to the forward clutch 40 is gradually increased. The clutch torque capacity of the clutch 66 for second gear with respect to the transmission input torque is set at a larger value than the forward clutch 40; therefore, the clutch 66 for second gear engages earlier. At this time, the energy absorbed by the clutch 66 for second gear is a small value which is close to the inertia of the transmission 10. Then, the forward clutch 40, which engages later than the clutch 66 for second gear, absorbs a larger amount of energy to reverse the inertia of the vehicle. Conversely, the reverse clutch 32 reverses the inertia 15 of the vehicle and absorbs a larger amount of energy when a shift is made from forward gear to reverse gear.

Thus, the transmission 10 needs to absorb a large amount of energy to absorb the inertia 15 of the vehicle when a shift is made from forward to reverse travel or from reverse to forward travel. Accordingly, the area of contact of the clutches 32 and 40 of the forward/reverse gear selector 20 must be increased. Increasing the area of contact of the clutches 32 and 40, however, would pose such problems as those described below:

(a) The radii of the clutch discs of the clutches 32 and 40 must be increased, with a resultant larger transmission 10.

(b) A larger clutch disc means a larger loss horsepower during idling, resulting in poor fuel economy of an engine.

Figure 11:
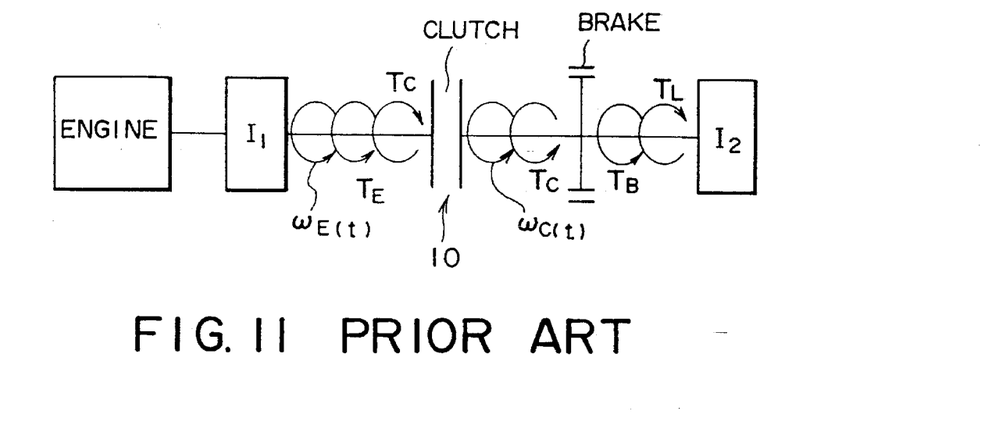
FIG. 11 is a diagram showing a calculation model for a clutch system for a conventional shift between forward and reverse.

As a solution to the problems, there is a conceivable method wherein a steering brake is interlocked when the speed change involving the shift between forward and reverse is made, thereby reducing the load on the transmission clutches. In this case, the transmission torque in the clutch system of the transmission 10 will be as shown in FIG. 11, provided that the clutch of the speed selector 50 of the transmission 10 remains unchanged, wherein $I_1$ denotes the input shaft equivalent inertial moment, $I_2$ denotes the inertial 15 of a vehicle, i.e., the output equivalent inertial moment, $\omega_E(t)$ indicates the engine speed, and $\omega_C(t)$ indicates the output rotational speed of the transmission. Further, $T_E$ indicates the output torque of the engine, $T_C$ indicates the output torque of the transmission clutch, $T_B$ denotes the braking torque, and $T_L$ denotes the running resistance of the vehicle.

The motion of such a system can be expressed by equations (1) and (2) given below:

$$I_1(d\omega_E/dt) = T_E - T_C \tag{1}$$

$$I_2(d\omega_C/dt) = T_C - T_L + T_B \tag{2}$$

Therefore, interlocking the brake at the time of shifting between forward and reverse causes the braking torque $T_B$ to be applied to output equivalent inertial moment $I_2$. When the forward second gear is shifted to the reverse third gear, the quantities $Q_C$ and $Q_B$ of work from the friction between the transmission clutch and the brake clutch, until the shift between forward and reverse, can be given by expressions (3) and (4) shown below:

$$Q_C = \int_0^{t1} T_C \left\{ (\omega_{EO} - \omega_{CO}) + \frac{1}{I_1} \int_O^t (T_E - T_C)dt - \frac{1}{I_2} \int_0^t (T_C + T_B - T_L)dt \right\} dt \quad (3)$$

$$Q_B = \int_0^{t2} T_B \left\{ \left( \omega_{CO} + \frac{1}{I_2} \int_O^t (T_C + T_B)dt - \frac{T_L}{I_2} t \right) \right\} dt \quad (4)$$

Decreasing the calorific value of a transmission clutch means decreasing the value of $Q_C$ in expression (3). Accordingly, in order to decrease the value of $Q_C$, the vehicle speed before making the shift is decreased so as to decrease the value of $(\omega_{EO} - \omega_{CO})$ of the first term of expression (3) or the value of the engine output torque $T_E$ is decreased to decrease the value of $(T_E - T_C)$ of the second term, or the braking torque $T_B$ is increased to increase the value of $(T_C + T_B - T_L)$ of the third term.

The first term of expression (3) denotes, however, the status before the shift is made, and therefore it should not be a factor to be controlled. Decreasing the engine output torque $T_E$ of the second term causes a power line without the transmission 10 to often develop "engine stall", and therefore it should not be selected as a factor to be controlled. Hence, it is concluded that the shift between forward and reverse should desirably be made by interlocking the brake so as to apply braking torque $T_B$ of the third term and the transmission output torque, thus reducing the thermal load on the transmission clutches.

Figure 12:
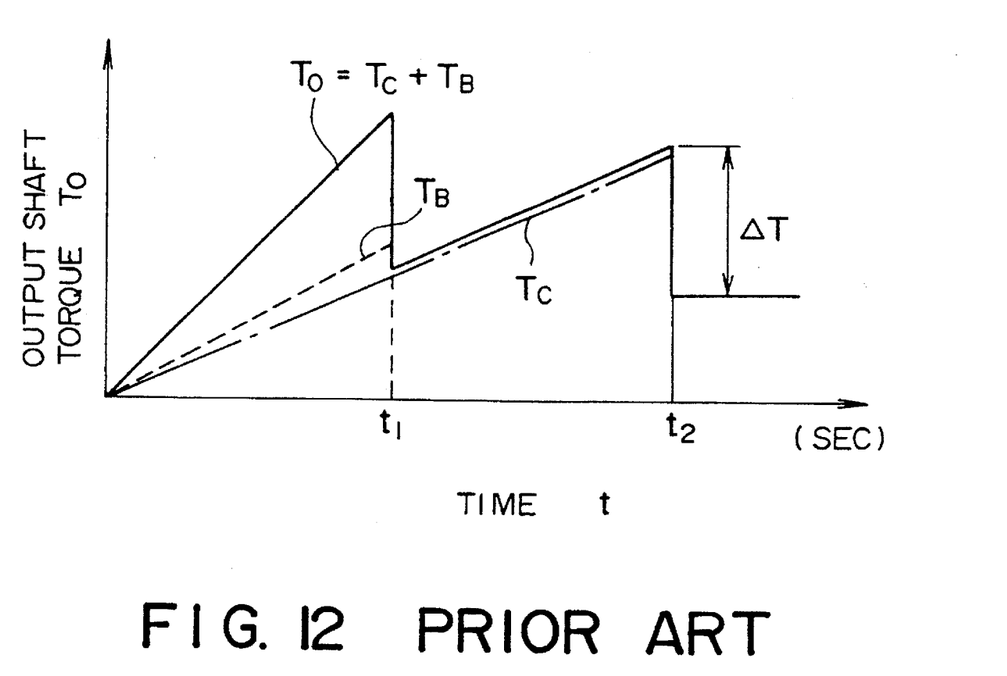
FIG. 12 is a diagram showing the changes in the output shaft torque observed when the steering brake is interlocked with a conventional transmission clutch.

When, however, the brake is interlocked with the transmission 10, a failure to provide a correct interlock timing or to select a proper method results in other problems such as poor shift quality. Specifically, the output shaft torque $T_O$, after braking is engaged, equals the sum of the clutch torque $T_C$ of the transmission 10 and the braking torque $T_B$, provided the running resistance $T_L$ is zero. Hence, when a speed change, which involves the shift between forward and reverse, is carried out, the output shaft torque $T_O$, after the braking is engaged when the brake is interlocked by an operator who depresses a brake pedal, changes as shown in FIG. 12 until a clutch of the transmission 10 completes engagement after a speed change command was issued.

Thus, the braking operation performed by the operator for making the shift between forward and reverse causes both the clutch torque $T_C$ and the braking torque $T_B$ to be applied at the same time, and these torques $T_C$ and $T_B$ linearly increase. This, in turn, causes the output shaft torque $T_O$ after braking to linearly increase. At a point where time $t_1$ has elapsed since the braking was engaged, the vehicle speed reduces to zero and the running direction of the vehicle switches from forward to backward or from backward to forward, then the braking torque $T_B$ is not applied after that point and only the clutch torque $T_C$ of the transmission 10 is generated. Therefore, when the braking is discontinued, the output shaft torque $T_O$ reduces greatly, causing an uncomfortable shifting shock. Likewise, when making a full shift between forward and reverse, as in the case of making a shift from the forward third gear to the reverse third gear, even if the load is shared by the brake, the clutch oil pressure at time $t_2$, at which the engagement of the transmission clutch is completed, remains high, resulting in a great difference $\Delta T$ between the clutch torque $T_C$ and the passing torque at that point. As a result, there remains an unsolved problem in which the shifting shock takes place at time $t_2$ when the engagement of the clutch is completed and a great peak torque is generated, leading to shortened service lives of gears and shafts.

SUMMARY OF THE INVENTION

The present invention has been made with a view toward eliminating the shortcomings of the prior art described above, and it is an object of the present invention to provide a method of and apparatus for speed change control which make it possible to reduce the thermal load on a transmission clutch at the time of a speed change which involves a shift between forward and reverse and to eliminate shifting shock by controlling the peak torque in the transmission.

According to the present invention, there is provided a speed change control method for engaging and disengaging a plurality of clutches of a transmission, to change the gear ratio of the transmission so as to change the rotational speed of an output shaft, wherein, when a shift between forward and reverse is made for a vehicle, a predetermined clutch is engaged and a braking force is applied to the output shaft so as to cause the acceleration of the vehicle given through the output shaft to change along a curve which is established in advance.

The application of the braking force, to be applied to the output shaft, should be started before the engagement of the clutch is begun, and after that the clutch is engaged as the braking force is reduced. The braking force should be increased in accordance with the rotational speed of the output shaft. Further, the application of the braking force is stopped when the rotational speed of the output shaft reduces below a preset reference value.

The engaging force of the clutch can be changed by changing the clutch oil pressure for operating the clutch according to the fuzzy reasoning based on a membership function and a pre-established fuzzy rule which shows the relationship between the amount of change in the vehicle acceleration observed at a preset time interval and the amount of change which has been determined previously. The clutch oil pressure is changed by controlling the amount of the change in the oil pressure in a predetermined time. The output shaft torque of the transmission, which is directly detected through a torque sensor, can be employed in place of the acceleration of the vehicle. The controlling method, wherein the acceleration of the vehicle is changed along a predetermined curve, can be applied not only for making a shift between forward and reverse for a vehicle but also for changing the vehicle speed or starting the vehicle.

An apparatus for implementing the method has a transmission equipped with a plurality of speed change gears and a clutch for selecting a combination of the gears to be meshed with each other, a clutch driving section for operating the clutch of the transmission, a steering brake for applying a braking force to the output shaft of the transmission, a brake driving section for operating the steering brake, revolution sensors for detecting the rotational speed of the input shaft, intermediate shaft, and output shaft of the transmission, and a speed change controller which determines the vehicle acceleration from the output shaft of the transmission in accordance with an output signal received from the revolution sensor and causes the vehicle acceleration to change along a predetermined acceleration curve by issuing a control signal to the clutch driving section and the brake driving section when a shift between forward and reverse for the vehicle is made.

An apparatus, for implementing the method when making a speed change in a vehicle or when starting the vehicle, has a transmission equipped with a plurality of speed change gears and a clutch for selecting a combination of the gears to be meshed with each other, a clutch driving section for operating the clutch of the transmission, revolution sensors for detecting the rotational speed of the input shaft, intermediate shaft, and output shaft of the transmission, and a speed change controller which determines the vehicle acceleration from the output shaft of the transmission in accordance with an output signal received from the revolution sensor and causes the vehicle acceleration to change along a predetermined acceleration curve by issuing a control signal to the clutch driving section when the vehicle speed is changed.

The construction according to the present invention described above absorbs the vehicle inertia of the output shaft at the time of a speed change by applying the braking force given by the brake, which provides a great energy absorbing power, rather than depending only on the slide of the clutch of the transmission. This makes it possible to significantly reduce the thermal load on the transmission clutch, thus enabling a prolonged service life of the clutch and also a reduced diameter of a clutch disc and fewer discs, helping to achieve a smaller transmission. Furthermore, since the acceleration of the vehicle is changed along the predetermined curve, it becomes possible to smoothly change the acceleration of the vehicle by smoothing the acceleration changing curve, thereby preventing the occurrence of a shifting shock.

Especially if the braking force is applied before the engagement of the clutches begins, the thermal load on the clutches can be securely reduced. Increasing the braking force applied to the output shaft in accordance with the rotational speed of the output shaft provides a proper braking force, allowing the load on the transmission clutch to be reduced securely and also the time required for changing the speed to be shortened. Stopping the application of the braking force when the rotational speed of the output shaft drops below a predetermined reference value makes it possible to prevent a delay in shifting time when a shift between forward and reverse is made.

Regarding the engaging power of the clutches, a smooth acceleration change can be easily achieved by changing the clutch oil pressure according to the fuzzy reasoning based on the fuzzy rule and the membership function, which are established in advance. The clutch oil pressure can be accurately controlled by controlling the oil pressure changing rate. The acceleration of the vehicle corresponds to the output torque of the output shaft; therefore, the acceleration of the vehicle can alternatively be controlled by detecting and controlling the output shaft torque.

BRIEF DESCRIPTION OF THE DPIWINGS

BEST MODE FOR CARRYING OUT THE INVENTION

Preferred embodiments of the method of and apparatus for speed change control in accordance with the present invention will be described in detail with reference to FIGS. 1 through 9. The parts, which correspond to those of the aforesaid prior art, will be given the same reference numerals, and the explanation thereof will be omitted.

Figure 2:
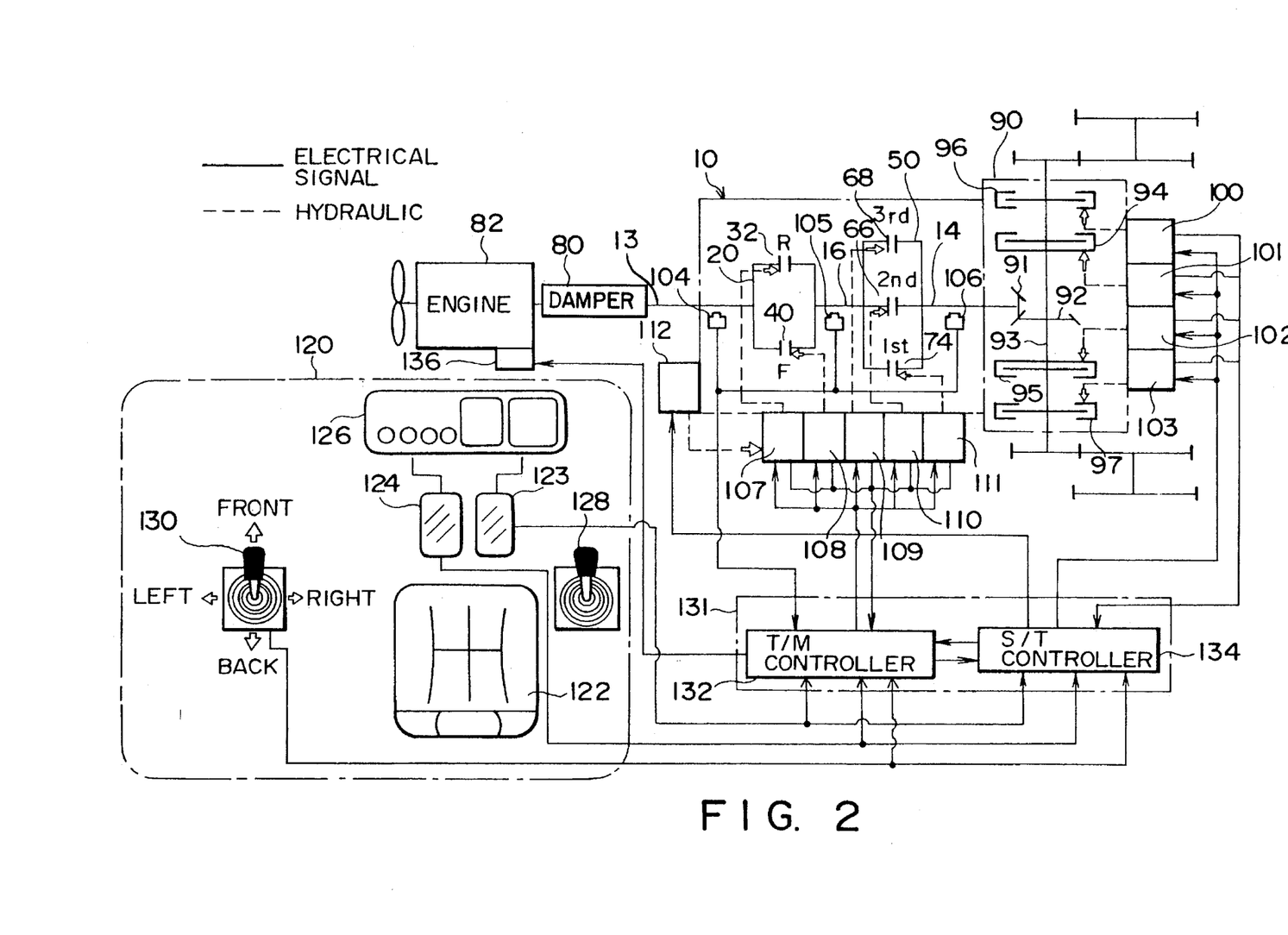
FIG. 2 is an explanatory drawing of a speed change control apparatus according to the embodiment of the present invention.

In FIG. 2, an input shaft 13 of the transmission 10 is connected to an engine 82 through a damper 80. Fixed on the distal end of an output shaft 14 is a pinion 91 of a clutch-type steering device (hereinafter referred to as "steering device") 90. Engaged with the pinion 91 is a bevel gear 92, so that the rotation of the output shaft 14 is transmitted to a shaft 93 which is orthogonal thereto. The steering clutches 94 and 95 are provided on both ends of the shaft 93, and the steering brakes 96 and 97 are mounted on the output shafts of the steering clutches 94 and 95. The steering brakes 96 and 97 are actuated by the oil pressure given through electronic control modulating valves (hereinafter referred to as "ECMVs") 100 and 103, which serve as the brake driving section. The steering clutches 94 and 95 are controlled by the oil pressure supplied through ECMVs 101 and 102, which are provided for the steering clutches 94 and 95.

The input shaft 13 of the transmission 10, the intermediate shaft 16, and the output shaft 14 are provided with revolution sensors 104, 105, and 106, respectively, to detect the rotational speeds of the respective shafts 13, 16, and 14. The reverse clutch 32, the forward clutch 40, the clutch 68 for third gear, the clutch 66 for second gear, and the clutch 74 for first gear of the transmission 10 are actuated through ECMVs 107 to 111, which serve as the clutch driving section provided for the aforesaid clutches and which are operated by the hydraulic pressure supplied from a main ECMV 112.

This engages or disengages the corresponding carriers or ring gears with or from the case 11.

A driver's cab 120 of a bulldozer is provided with a brake pedal 123 and an inching pedal 124 in front of a driver's seat 122 on the floor, a display panel 126 being disposed at the front extremity. Disposed at the right front of the driver's seat 122 is a blade bar 128 for operating a blade, and disposed at the left front is a steering lever 130 for controlling the orientation of the bulldozer. The operating signal of the steering lever 130 is supplied, together with the operating signals of the brake pedal 123 and the inching pedal 124, to a transmission controller (hereinafter referred to as "T/M controller") 132 and a steering controller (hereinafter referred to as "S/T controller") which constitute a speed change controller 131.

The T/M controller 132 also receives the rotational speeds of the input shaft 13, the intermediate shaft 16, and the output shaft 14 of the transmission 10, which are detected by the revolution sensors 104 to 106, and pressure signals for controlling the hydraulic modulation timing supplied from the ECMVs 107 to 111, which control the engaging power of the respective clutches of the transmission 10. As discussed in detail later, the T/M controller 132 calculates the clutch oil pressure and supplies current control signals to the respective ECMVs 107 to 111, and it also issues signals to an engine controller 136.

The S/T controller 134 receives the pressure signals from the ECMVs 100 to 103, which control the steering clutches 94, 95 of the steering device 90 and the steering brakes 96, 97, in addition to the signals or the like from the aforesaid steering lever 130. The S/T controller 134 is electrically connected to the T/M controller 132 via a signal line to exchange data with the T/M controller 132.

The operation of the embodiment having the construction described above will now be described.

When an operator, who is not shown, takes an action to change the speed, the steering lever 130 sends the speed change signal (operating signal) to the T/M controller 132 and the S/T controller 134. The detection signal of the revolution sensor 106, which detects the number of revolutions of the output shaft of the transmission 10, is applied to a speed change signal output circuit, which is not illustrated, then the speed change signal output circuit outputs the speed change signal to the T/M controller 132 in accordance with the detection signal of the revolution sensor 106. In other words, the speed change signal output circuit monitors the traveling state of the bulldozer in terms of the rotational speed of the output shaft 14 which is detected by the revolution sensor 106. For instance, when the speed change signal output circuit detects that the bulldozer traveling at the forward third gear has dropped its speed to the speed of the forward second gear, it supplies the speed change signal to the T/M controller 132.

When the T/M controller 132 receives the speed change signal from the steering lever 130 or the speed change signal output circuit, not shown, it initiates a control program for an all clutch control system (hereinafter referred to as "ACC") which controls the clutches 32, 40, 66, 68, and 74 of the transmission 10 and the steering clutches 94 and 95 of the steering device 90 (steps 150 and 152 shown in FIG. 1). When the ACC control program is initiated, the amount of control (target acceleration) is first set as shown in step 154.

The target acceleration, i.e., the amount of control is determined by reading the data stored beforehand in a memory, not shown, or an internal memory of the T/M controller 132 in accordance with the speed change signal and the decel/accel signal supplied from the T/M controller 132 and the rotational speeds of the input shaft 13, the intermediate shaft 16, and the output shaft 14 of the transmission 10, which are detected by the revolution sensors 104 to 106; and then the determined target acceleration value is stored in a setting section (not shown) of the T/M controller 132.

In the case of the embodiment, the target acceleration is given as the target output shaft torque $T_O$, because the output shaft torque, $T_O = T_C + T_B$ after the steering brakes 96 and 97 are operated, corresponds to the acceleration. When the speed change involves a shift between forward and reverse, the target output shaft torque $T_O$ changes smoothly, as shown by the solid curve in FIG. 3, and it is set so that the difference $\Delta T$ from the passing torque is minimized. The torque curve is prepared according to speed change data created by experiments or the like to ensure that the shifting shock will be controlled and that the operator will feel comfortable when a speed change is made. Peak $T_{MAX}$ of the target output shaft torque $T_O$ is set so that it is smaller than a conventional peak torque.

When the amount of control has been set, the T/M controller 132 determines whether the speed change involving the shift between forward and reverse (hereinafter referred to as "FR speed change") requires the clutches 32 and 40 of the forward/reverse selector 20 to be operated, as in the case where the shift is made from forward to reverse or vice versa (step 156). If the T/M controller 132 decides that the speed change is a FR speed change, that is, if the shift between forward and reverse is made by the steering lever 130, then the T/M controller 132 proceeds from step 156 to step 158 where it determines whether the vehicle speed V is smaller than a predetermined reference vehicle speed $V_O$ (e.g., the rotational speed of the output shaft 14 is 1000 rpm); and if it finds $V > V_O$, then it issues the information to the S/T controller 134.

If the detected vehicle speed V is larger than the reference value $V_O$, then the S/T controller 134 reads out the brake oil pressure $P_B(t)$, required to obtain a braking force which is predetermined for that particular vehicle speed, from the data map stored in a memory, which is not shown, according to the vehicle speed V obtained when the steering lever 130 was operated (step 160). The data on the brake oil pressure $P_B(t)$ shows a linear increase in relation to the vehicle speed V as shown, for example, in FIG. 4. The steering brake is not actuated when the vehicle speed V is lower than the reference vehicle speed $V_O$.

The S/T controller 134 calculates the control current values of the ECMVs 100 and 103 for obtaining brake oil pressure $P_B(t)$ which has been just read, and supplies the calculated values to the ECMVs 100 and 103 to control the steering brakes 96 and 97 so that they work with the clutch 32 or the clutch 40 of the transmission 10 (steps 162 and 164). Then, the ACC control program goes back to step 156.

Figure 3:
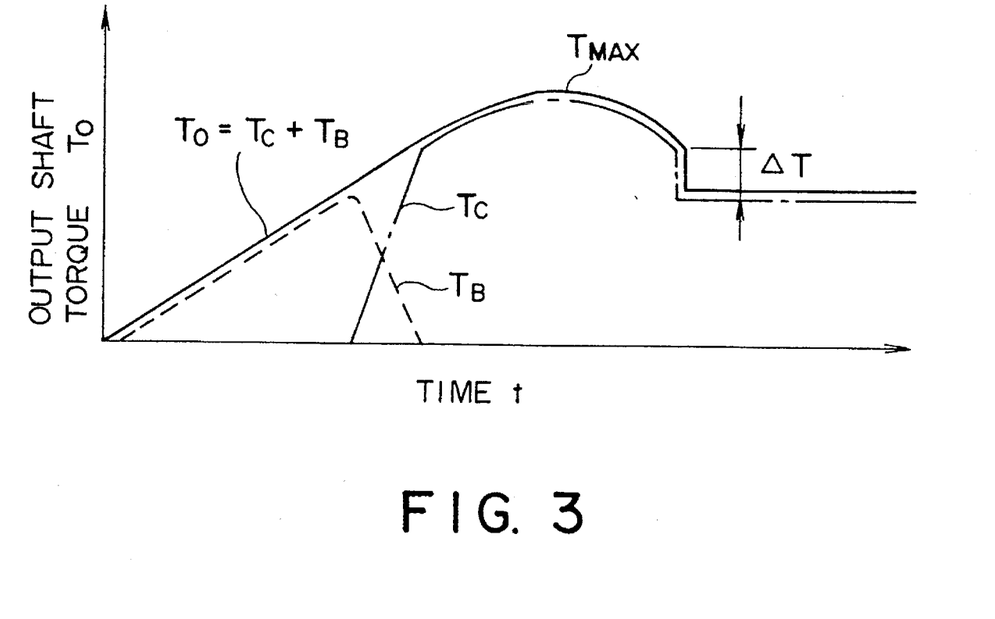
FIG. 3 is a diagram showing an example of a target set torque according to an embodiment of the present invention.
Figure 4:
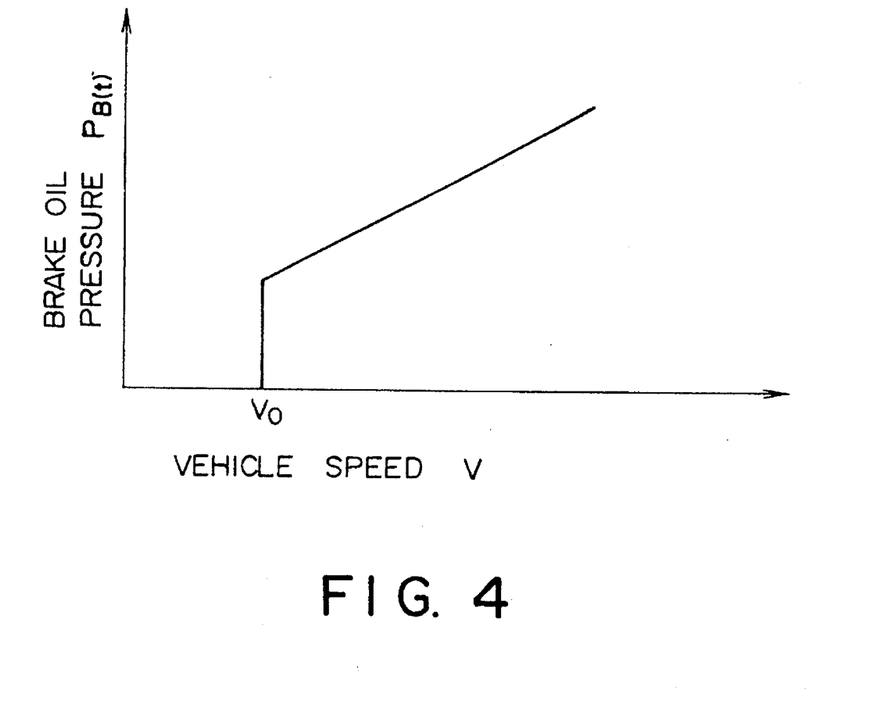
FIG. 4 is a diagram showing an example of a hydraulic data map of a steering brake according to the embodiment of the present invention.

The steering brakes 96 and 97 operate to apply the braking force, and the braking torque $T_B$, which linearly increases as shown by the dashed line of FIG. 3, is generated and applied to the output shaft 14. The braking force decreases the vehicle speed (the rotational speed of the output shaft 14) to $V \leq V_O$, the program proceeds from step 158 to step 166 wherein a brake release signal is issued from the T/M controller 132 to the S/T controller 134. As soon as the S/T controller 134 receives the brake release signal, it releases the braking force of the steering brakes 96 and 97 so that the braking torque $T_B$ gradually decreases as shown by the dashed line of FIG. 3. Continuing the application of the braking force until V=0, i.e., until the vehicle speed becomes completely zero, causes a delay in the speed change timing; therefore, the braking force is released when the vehicle speed becomes $V \leq V_O$, in order to avoid such a delay.

On the other hand, if the T/M controller 132 decides that the speed change signal indicates a speed change which does not involve the operation of the reverse clutch 34 or the forward clutch 40, i.e., if the speed change is not the FR speed change, then the T/M controller 132 applies an oil pressure (control current) by operating only the transmission 10 without actuating the steering brake 96 or 97, so that a smooth output shaft torque $T_O$ as shown in FIG. 3 is obtained. If the steering brake 96 or 97 is disengaged in step 166, then the T/M controller 132 applies the control current to the ECMVs 107 to 111, provided for the respective clutches of the transmission 10, so that a part of the clutch torque $T_C$ of the transmission 10 overlaps the braking torque $T_B$, as shown by the chain line of FIG. 3.

In the case of a load clutch, the clutch torque $T_C$ of the transmission 10 is controlled by implementing the IF-THEN fuzzy reasoning of step 168 in accordance with the pre-established membership function and the fuzzy rule, in order to determine the gradient of the clutch oil pressure (the change in oil pressure per unit time) $\theta_C$. The control current is applied to the ECMVs 107 to 111, which actuate the load clutch, according to the above determined gradient. The load clutch is the reverse clutch 32 or the forward clutch 40 of the forward/reverse selector 20 at the time of starting or the shift between forward and reverse, or it is the clutch 74, 66, or 68 for the first, second, or third gear of the speed selector 50 when only the speed is being changed. The control of a clutch other than the load clutch of the transmission 10 will be discussed later.

Figure 5:
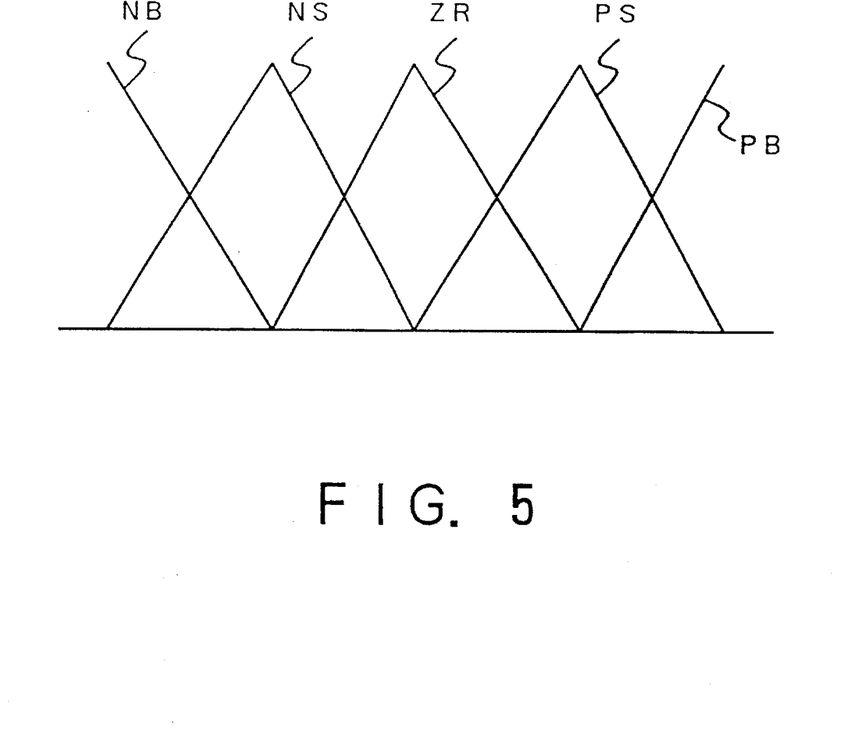
FIG. 5 is a diagram showing an example of the membership function used for the fuzzy reasoning whereby the speed change control method of the invention is implemented.
Figure 6:
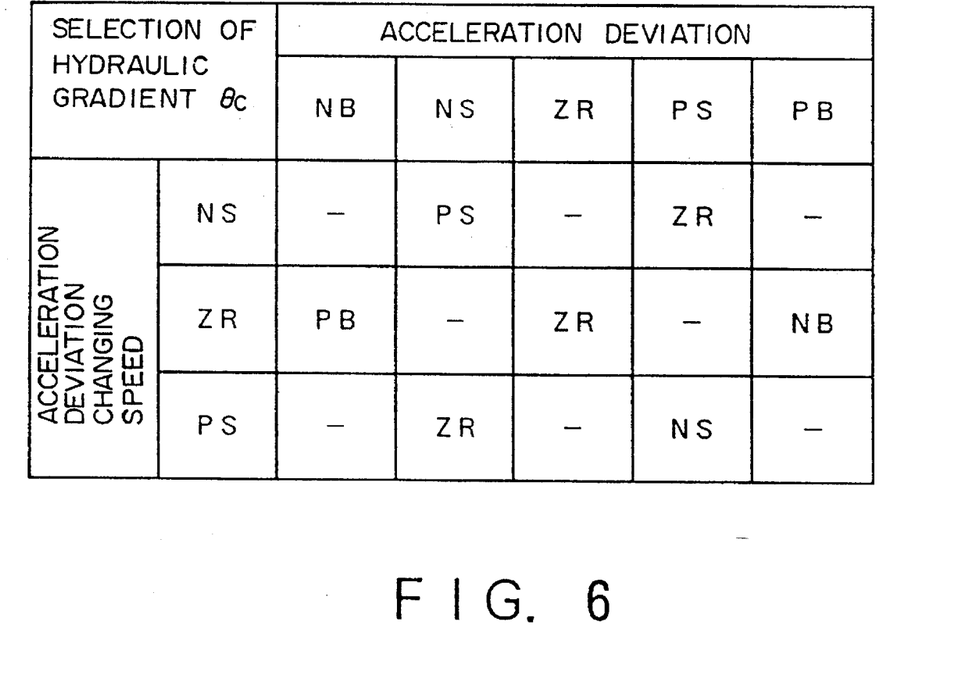
FIG. 6 is an explanatory diagram showing an example of the fuzzy rule according to which the speed change control method of the invention is implemented.

FIG. 5 and FIG. 6 show examples of the membership function and the fuzzy rule according to the invention.

The membership function NB shown in FIG. 5 indicates that, for example, the acceleration deviation $\Delta\alpha = \alpha - \alpha_O$ is negative and large, i.e., the detected acceleration $\alpha$ is smaller than the target acceleration $\alpha_O$, and the value of the hydraulic gradient $\theta_C$ is set smaller than the current value; the membership function NS indicates that the detected acceleration $\alpha$ is slightly smaller than the target acceleration $\alpha_O$ and that the hydraulic gradient $\theta_C$ is set slightly smaller than the current value.

The membership function ZR denotes that the detected acceleration $\alpha$ is approximately the same as the target acceleration $\alpha_O$ (the acceleration deviation $\Delta\alpha$ is nearly zero) and that the hydraulic gradient $\theta_C$ is not changed much from the current value.

The membership function PS denotes that the detected acceleration $\alpha$ is slightly larger than the target acceleration $\alpha_O$ and that the hydraulic gradient $\theta_C$ is set larger than the current value.

The fuzzy rule shown in FIG. 6 has the following meanings:

For instance, if the detected acceleration $\alpha$ is slightly smaller than the target acceleration $\alpha_O$, i.e., if the acceleration deviation $\Delta\alpha = \alpha - \alpha_O$ is negative and slightly small while the changing speed of acceleration deviation $\Delta\alpha$ is slightly on the positive side, then the hydraulic gradient $\theta_C$ is ZR as shown in FIG. 6 by the overlap of the column NS of "Acceleration Deviation" and the row PS of "Acceleration Deviation Changing Speed", and the hydraulic gradient $\theta_C$ is controlled so as to maintain approximately the current value. "Acceleration Deviation Changing Speed" refers to the difference $\delta\alpha = \Delta\alpha_{n+1} - \Delta\alpha_n$ between the acceleration deviation $\Delta\alpha_{n+1}$ which has been obtained this time and the acceleration deviation $\Delta\alpha_n$ which was obtained previously.

If, for example, the detected acceleration $\alpha$ (detected torque T) is slightly larger than the target acceleration $\alpha_O$ (target torque $T_O$) (PS) and the acceleration deviation changing speed $\delta\alpha$ (torque deviation changing speed $\delta T$) is slightly large (PS), i.e., if the column of "Acceleration Deviation" in FIG. 6 is PS and the acceleration deviation changing speed $\delta\alpha$ is slightly on the positive side, i.e., the row of "Acceleration Deviation Changing Speed" is PS, then the T/M controller 132 sets the gradient $\theta_C$ of the clutch oil pressure at a value which is slightly smaller than the current value (NS) to slightly slow down the engaging speed of the load clutch as will be discussed later, thus changing the output shaft torque $T_O$ (vehicle acceleration) of the transmission 10 even more slowly.

If, for example, the detected acceleration $\alpha$ is larger than the target acceleration $\alpha_O$ and the column of "Acceleration Deviation" in FIG. 6 is PB and the acceleration deviation changing speed $\delta\alpha$ is approximately zero and the row of "Acceleration Deviation Changing Speed" is ZR, then the T/M controller 132 sets gradient $\theta_C$ of the clutch oil pressure at a value which is smaller than the current value (NB) to further slow down the changing speed of the output shaft torque $T_C$ of the transmission 10, thereby controlling the change in the vehicle acceleration. After that, a similar procedure is taken to control the gradient $\theta_C$ of the clutch oil pressure for each column shown in FIG. 6.

Figure 1:
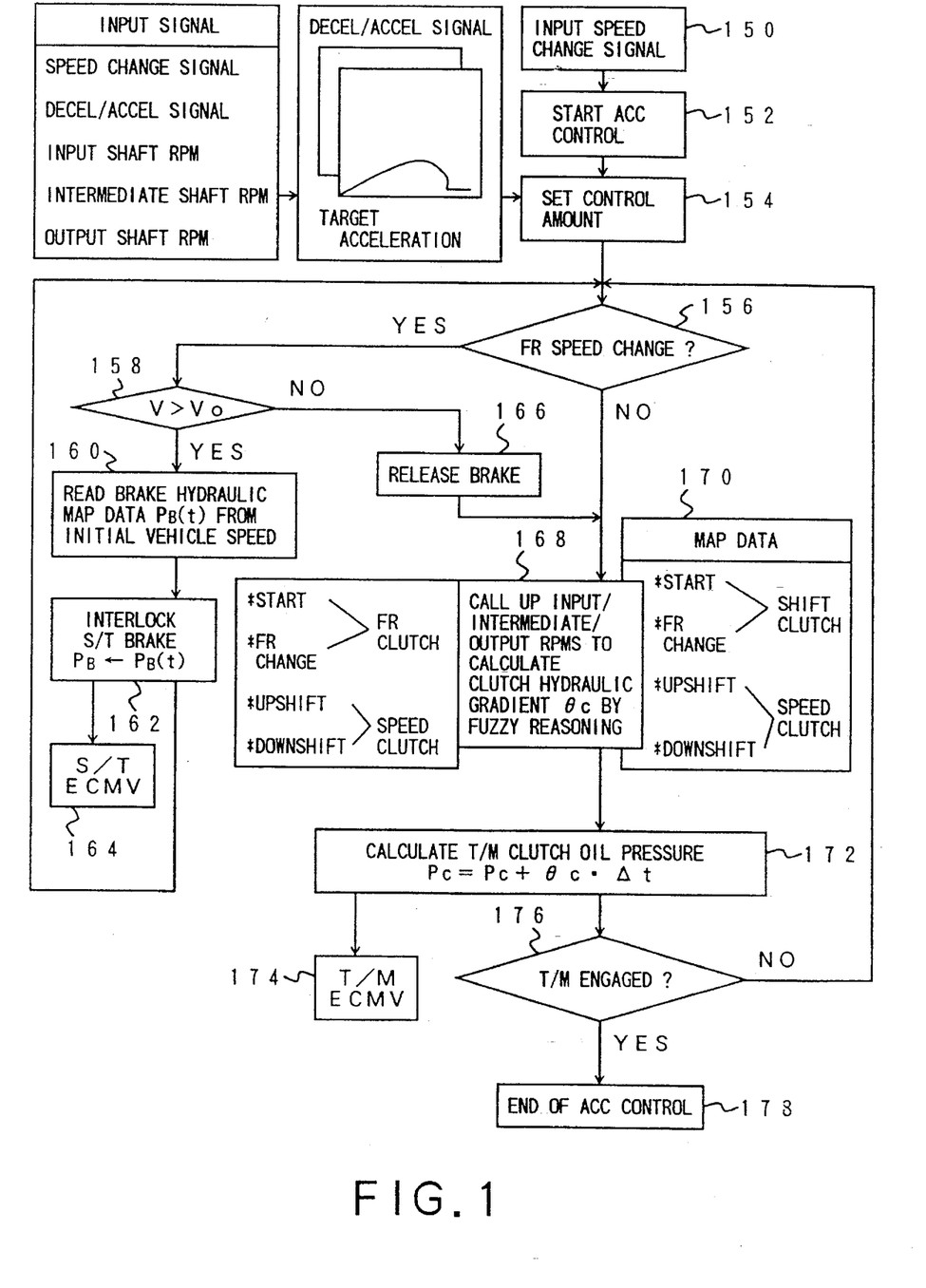
FIG. 1 is a flowchart showing the speed change control method according to an embodiment of the present invention.

On the other hand, the T/M controller 132 reads data on the hydraulic gradient $\theta_C$ from the map data stored in the memory beforehand, as shown in step 170 of FIG. 1, for the clutches other than the load clutch. After that, the T/M controller 132 proceeds to step 172 wherein the clutch oil pressure $P_C$ of the transmission 10 to be controlled is determined according to the following expression:

$$P_C = P_C + \theta_C \cdot \Delta t \qquad (5)$$

Then the T/M controller 132 supplies the current signal to the one of the ECMVs 107 to 111 which corresponds to that particular clutch (step 174). Further, the T/M controller 132 determines whether the engagement of the clutch of the transmission 10 has been completed from the change or the like of the output shaft torque $T_O$ (step 176). If the T/M controller 132 decides that the clutch engagement has been completed, then it terminates the ACC control program (step 178); if it decides that the clutch engagement has not yet been completed, then it goes back to step 156 to continue the ACC control.

Thus, the embodiment is designed to apply the braking force of the brake, which has a great energy absorbing power, prior to the start of the clutch engagement, rather than depending solely on the slide of the clutch of the transmission 10. This makes it possible to significantly and securely reduce the thermal load on the transmission clutch, and to achieve a prolonged service life of the clutch, a reduced diameter of a clutch disc, and fewer discs, leading to a reduced size of the transmission 10. Furthermore, since the acceleration of the vehicle is changed along a predetermined curve, it becomes possible to smoothly change the acceleration of the vehicle by preparing a smooth curve along which the vehicle acceleration is changed, thereby preventing the occurrence of a shifting shock. This also smooths the torque of the output shaft 14.

In addition, since the braking force to be applied to the output shaft 14 is increased in accordance with the rotational speed of the output shaft 14, the load on the transmission clutch can be securely reduced and the time required for a speed change to be completed can be shortened. Stopping the application of the braking force when the rotational speed V of the output shaft 14 drops below the predetermined reference value $V_O$ before the inversion enables the prevention of a delay in the shifting time when a shift between forward and reverse is made.

Further, since the embodiment sets the maximum target acceleration at a small value, the torque generated in the transmission 10 can be minimized, enabling a prolonged service life. The embodiment is also designed to control the oil pressures of the respective clutches of the transmission 10 and the steering brake clutches through the ECMVs which are provided for the respective clutches. This feature permits a reduced operating load on an operator, an easier start on a slope, and higher working speed. The vehicle acceleration is calculated according to the rotational speeds of the input shaft 13, the intermediate shaft 16, and the output shaft 14, which are detected through the revolution sensors 104 to 106, thereby making it possible to prevent the system from becoming complicated and also to prevent increased cost. Performing control based on a target torque rather than on the target acceleration allows more accurate hydraulic control with a resultant higher control accuracy by directly detecting the torque through a torque sensor.

Figure 7:
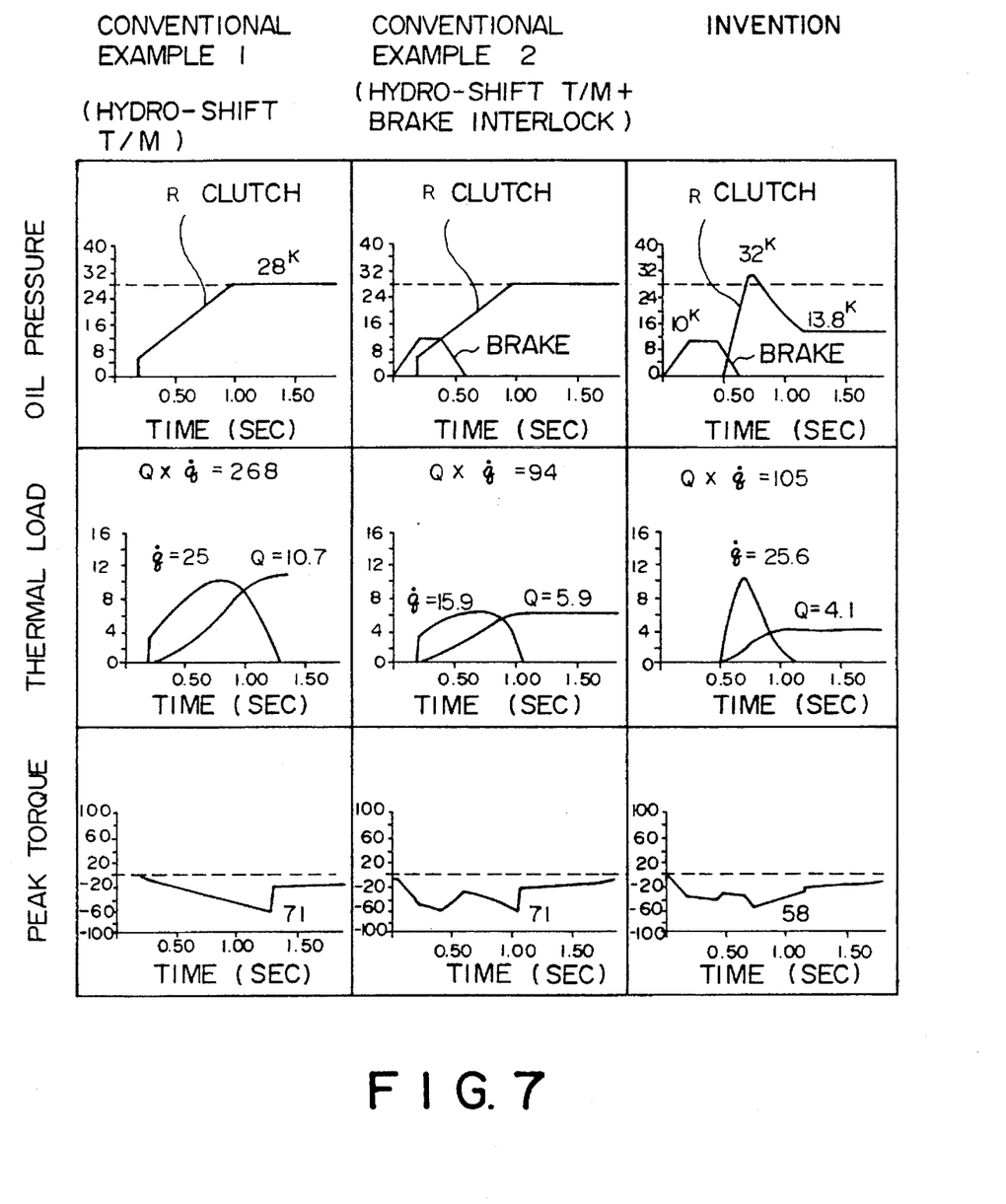
FIG. 7 is a diagram showing a result of the simulation comparison between the speed change control method of the invention and conventional speed change control methods.

FIG. 7 shows the simulation results of a comparison between the speed change by the ACC control according to the invention and the speed change by conventional transmissions.

The Conventional Example 1 on the left in FIG. 7 shows a case where only the reverse clutch (hereinafter referred to as "R clutch") is used for making the shift from forward to reverse in a hydro-shift transmission (hereinafter referred to as "hydro-shift T/M). When the oil pressure of the R clutch is gradually increased as illustrated until it reaches 28 kg/cm$^2$ in about a second since the steering lever was operated, the calorific value Q of the R clutch is 10.7 kg·m/cm$^2$ and the heat rate q is 25 kg·m/cm$^2$/s, and the thermal load which is the product of the calorific value Q and the heat rate q becomes approximately 268 kg·m/cm$^2$·kg·m/cm$^2$/s. The peak torque of the output torque after the braking becomes 71 kg·m, generating a great shifting shock when the engagement is completed. The torque, however, is set so that the engine output torque is positive and therefore the output torque of the output shaft is negative.

The Conventional Example 2 shows a case where the steering brake is interlocked with the R clutch of the hydro-shift T/M by the operator who depresses the brake pedal, thereby operating both of them at the same time when making the FR speed change. The Conventional Example 2 allows the thermal load to be reduced to nearly one third; however, it involves a great change in the torque when the shift is made from forward to reverse because the braking torque becomes zero. Furthermore, in this conventional example, a similar change in torque to that of Conventional Example 1 takes place at the time of the completion of the engagement, causing another shifting shock.

When the ACC control according to the invention is carried out, the oil pressure of the R clutch can be controlled to a lower level than the conventional clutch oil pressure as a whole, although it temporarily goes up. In addition, the thermal load can be reduced to a half or less of the Conventional Example 1, although it is slightly larger than that of the Conventional Example 2. Furthermore, the peak torque is set to a small value and the target vehicle acceleration curve is established to minimize the difference from the passing torque; therefore, the peak torque is as small as 58 kg·m and the change in torque at the completion of engagement is extremely small, thus making it possible to prevent a shifting shock from taking place.

Figure 8:
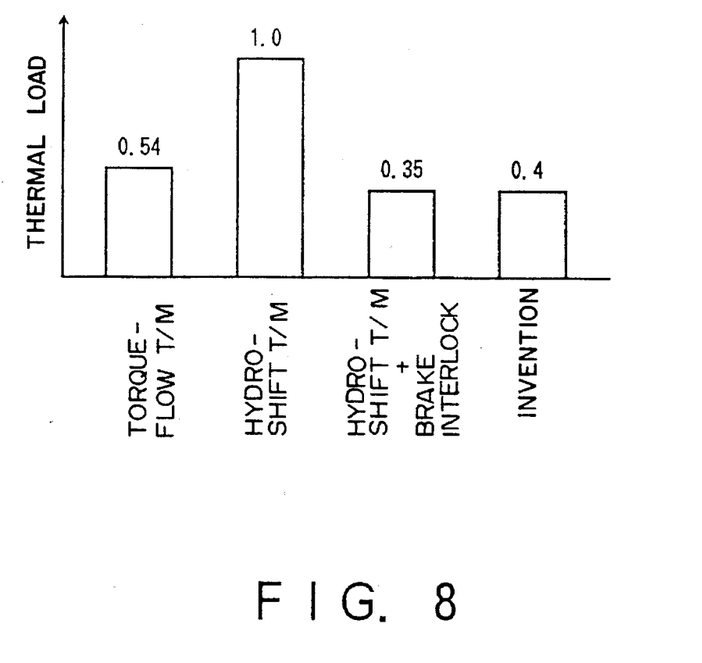
FIG. 8 is a diagram showing the comparison in thermal load between the speed change control method of the invention and the conventional speed change control methods.
Figure 9:
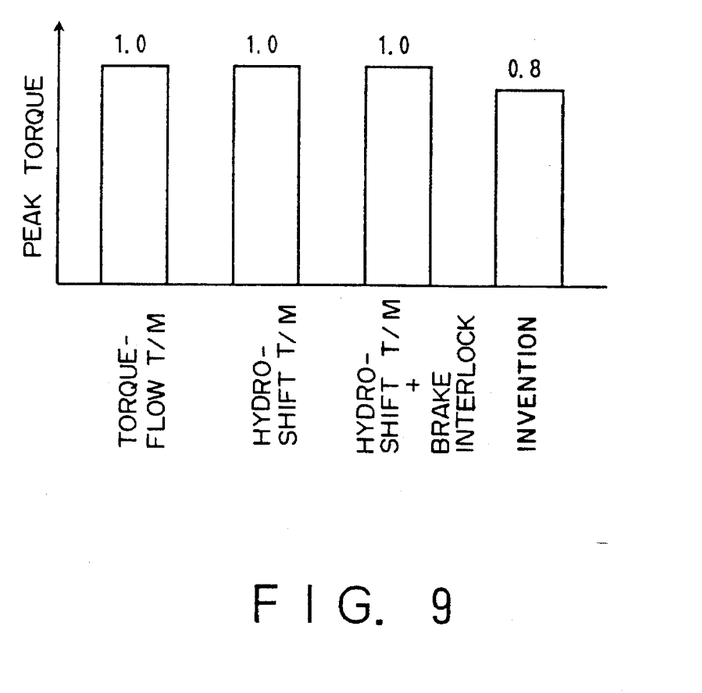
FIG. 9 is a diagram showing the comparison in the peak torque of the output shaft between the speed change control method of the invention and the conventional speed change control method.

FIG. 8 and FIG. 9 show the results of comparison between the effect in speed change obtained by the ACC control according to the invention and the effect in speed change obtained by other methods on the thermal load and peak torque observed when the FR speed change is made. In both drawings, the thermal load or the peak torque when the shift is made from forward to reverse by using only the R clutch of the hydro-shift T/M is assumed to be 1. For the purpose of comparison, an example where the torque-flow T/M is used is also given.

As it is obvious from the charts, the thermal load in the case of the invention is 40% of that in the case of the hydro-shift T/M, and the peak torque can be controlled to 80%. The conventional method wherein the steering brake is interlocked cannot achieve a smaller peak torque, although it reduces the thermal load.

In the embodiment described above, the target acceleration is set and the acceleration is determined based on the output rpm of the transmission; however, the acceleration of the vehicle can be directly detected through an acceleration sensor and compared with the target acceleration. Additionally, the target acceleration and the target torque can be preset, so that the torque can be directly detected through a torque sensor and compared with the target torque. In the embodiment described above, the case where the present invention is applied to a bulldozer has been described; however, the present invention can be applied to other vehicles such as a wheel loader and various types of apparatuses.

INDUSTRIAL APPLICABILITY

The present invention is useful as a method of and apparatus for speed change control which make it possible to markedly reduce the thermal load on a transmission clutch, prevent a shock from occurring when the speed is changed, securely reduce the load on the transmission clutch, shorten the time required for a speed change to be completed, prevent a time delay in shifting between forward and reverse, and control the torque so that it changes along a pre-established smooth curve of target acceleration.

What is claimed is:

1. A speed change control method for engaging and disengaging a plurality of clutches of a transmission of a vehicle to change a gear ratio of the transmission so as to change a rotational speed of an output shaft of the transmission and for effecting a shift between forward travel and reverse travel of said vehicle, said method comprising the steps of:

storing braking data representing braking forces which are predetermined for particular rotational speeds of said output shaft;

storing deceleration/acceleration data representing a target deceleration/acceleration curve wherein a torque of said output shaft changes smoothly with time;

providing a signal directing a shify between forward travel and reverse travel of said vehicle;

detecting the rotational speed of said output shaft when said signal is provided:

selecting from the thus stored braking data a braking force in accordance with the thus detected rotational speed of said output shaft;

applying, in response to a providing of said signal directing a shift between forward travel and reverse travel, the thus selected braking force to said output shaft to effect a braking torque on said output shaft;

engaging a predetermined clutch among said plurality of clutches in response to a providing of said signal directing a shift between forward travel and reverse travel;

increasing the thus applied braking force until a speed of said vehicle is reduced to a predetermined value, and then gradually decreasing the thus applied braking force to zero while gradually increasing an engagement of said predetermined clutch so as to cause a deceleration/acceleration of the vehicle given through said output shaft to smoothly change along said target deceleration/acceleration curve to thereby decrease shock to the vehicle upon a completion of the engagement of said predetermined clutch.

2. A method in accordance with claim 1, wherein the step of applying the thus selected braking force to said output shaft comprises starting the application of the thus selected braking force before the step of engaging said predetermined clutch is begun, and then reducing said thus applied braking force as said predetermined clutch is being engaged.

3. A method in accordance with claim 1, wherein each braking force represented by the thus stored braking data is a function of a particular rotational speed of the output shaft such that the thus represented braking forces increase in accordance with increases in the particular rotational speeds of the output shaft.

4. A method in accordance with claim 1, wherein the step of applying said thus selected braking force to said output shaft is stopped when the rotational speed of the output shaft reduces below a preset reference value.

5. A method in accordance with claim 4, wherein the step of engaging a predetermined clutch comprises changing an engaging force of said predetermined clutch by changing a clutch oil pressure, for operating said predetermined clutch, according to a fuzzy reasoning based on a pre-established membership function and a fuzzy rule showing a relationship between an amount of change in the acceleration of said vehicle observed during a preset time interval and an amount of change which had been determined previously.

6. A method in accordance with claim 5, wherein said clutch oil pressure is changed by controlling the amount of change in said clutch oil pressure in a predetermined time.

7. A method in accordance with claim 1, wherein the step of engaging a predetermined clutch comprises changing an engaging force of said predetermined clutch by changing a clutch oil pressure, for operating said predetermined clutch, according to a fuzzy reasoning based on a pre-established membership function and a fuzzy rule showing a relationship between an amount of change in the acceleration of said vehicle observed during a preset time interval and an amount of change which had been determined previously.

8. A method in accordance with claim 7, wherein said clutch oil pressure is changed by controlling the amount of change in said clutch oil pressure in a predetermined time.

9. A method in accordance with claim 7, wherein said amount of change in the acceleration of said vehicle observed during a preset time interval is determined by detecting an amount of change in an output shaft torque of said output shaft.

10. A speed change control apparatus comprising:

a transmission equipped with a plurality of speed change gears, a clutch for selecting a combination of the gears to be meshed with each other, and an output shaft;

a clutch driving section for operating the clutch of the transmission;

a steering brake for applying a braking force to the output shaft of said transmission;

a brake driving section for operating the steering brake;

a revolution sensor for detecting the rotational speed of the output shaft of said transmission; and a speed change controller for storing braking data representing braking forces which are predetermined for particular rotational speeds of said output shaft, for storing deceleration/acceleration data representing a target deceleration/acceleration curve wherein a torque of said output shaft changes smoothly with time, for determining a vehicle deceleration/acceleration from said output shaft of said transmission in accordance with an output signal received from said revolution sensor, for selecting from the thus stored braking data a braking force in accordance with the thus detected rotational speed of the output shaft, and for causing said vehicle deceleration/acceleration to smoothly change along said target deceleration/acceleration curve by issuing a control signal to said clutch driving section and said brake driving section when a shift between forward and reverse in the vehicle is made.

11. Apparatus in accordance with claim 10, wherein said control signal to said clutch driving section and said brake driving section causes said brake driving section to operate said steering brake to apply a braking force to said output shaft before said clutch driving section operates the clutch of the transmission such that said clutch is engaged.

12. Apparatus in accordance with claim 11, wherein said control signal to said clutch driving section and said brake driving section causes said brake driving section to reduce said braking force as said clutch is being engaged.

13. Apparatus in accordance with claim 10, wherein said speed change controller controls the magnitude of the braking force applied to said output shaft as a function of the rotational speed of the output shaft.

14. Apparatus in accordance with claim 10, wherein said speed change controller stops the application of said braking force to said output shaft when the rotational speed of the output shaft reduces below a preset reference value.

15. Apparatus in accordance with claim 10, wherein said speed change controller starts the application of the braking force before said clutch begins to engage, and then reduces said braking force after said clutch is engaged, and wherein the braking force applied to said output shaft is increased in accordance with the rotational speed of the output shaft.

16. Apparatus in accordance with claim 15, wherein the speed change controller stops the application of said braking force to said output shaft when the rotational speed of the output shaft reduces below a preset reference value.

* * * * *